United States Patent
Chigurupati

(10) Patent No.: US 9,474,297 B2
(45) Date of Patent: *Oct. 25, 2016

(54) LOW-SODIUM SALT COMPOSITION

(75) Inventor: Sambasiva Chigurupati, Omaha, NE (US)

(73) Assignee: S&P Ingredient Development, LLC, Minnetonka, MN (US)

(*) Notice: Subject to any disclaimer, the term of this patent is extended or adjusted under 35 U.S.C. 154(b) by 364 days.

This patent is subject to a terminal disclaimer.

(21) Appl. No.: 12/067,009

(22) PCT Filed: Aug. 31, 2006

(86) PCT No.: PCT/US2006/034325
§ 371 (c)(1),
(2), (4) Date: Oct. 8, 2008

(87) PCT Pub. No.: WO2007/032941
PCT Pub. Date: Mar. 22, 2007

(65) Prior Publication Data
US 2009/0117254 A1        May 7, 2009

Related U.S. Application Data

(63) Continuation-in-part of application No. 11/380,522, filed on Apr. 27, 2006, now abandoned.

(60) Provisional application No. 60/755,125, filed on Dec. 30, 2005, provisional application No. 60/717,001, filed on Sep. 14, 2005.

(51) Int. Cl.
*A23L 1/237* (2006.01)
*A23L 1/22* (2006.01)

(52) U.S. Cl.
CPC ............ *A23L 1/237* (2013.01); *A23L 1/22066* (2013.01); *A23L 1/22083* (2013.01)

(58) Field of Classification Search
None
See application file for complete search history.

(56) References Cited

U.S. PATENT DOCUMENTS 1,874,055 A * 8/1932 Liebrecht ...................... 426/649
1,978,040 A    10/1934 Werner
(Continued)

FOREIGN PATENT DOCUMENTS

CA         1155330 A    10/1983
CN         1559436 A    1/2005
(Continued)

OTHER PUBLICATIONS

Kikuchi et al. Japanese Patent Application H05-103618 1993 Derwent Abstract.*
(Continued)

*Primary Examiner* — Felicia King
(74) *Attorney, Agent, or Firm* — Fish & Richardson P.C.

(57) ABSTRACT

Low-sodium salt compositions/substitutes, Modified Potassium Chlorides (MPCs) and methods of making the same. The salt compositions/substitutes preferably include NaCl, KCl and a modifier(s), preferably a cereal flour such as rice flour. A food grade acidulant is preferably included. The composition/substitute will preferably have a Na/K ratio of from about 0.1 to about 9.0, most preferably about 1.0. MPCs preferably include KCl and a modifier(s), preferably a cereal flour such as rice flour. A food grade acidulant is preferably included. The salt compositions/substitutes and MPCs are preferably made by drum drying, extrusion cooking or agglomeration procedures. The MPC is preferably blended and/or co-ground with unmodified NaCl in any desired ratio, preferably 50/50, which gives a Na/K ratio of about 1 (i.e. 20% sodium and 20% potassium), to cost-effectively provide a salt substitute without modifying the NaCl.

5 Claims, 2 Drawing Sheets

(56) References Cited

U.S. PATENT DOCUMENTS

| | | |
|---|---|---|
| 2,500,919 A | 3/1950 | Cahn |
| 2,596,333 A * | 5/1952 | Halpern et al. ............... 426/96 |
| 2,601,112 A * | 6/1952 | Freedman ..................... 426/649 |
| 2,742,366 A | 4/1956 | Power |
| 2,824,008 A | 2/1958 | Perri |
| 2,829,056 A | 4/1958 | Kemmerer |
| 2,874,027 A * | 2/1959 | Gloss ........................... 423/314 |
| 2,900,268 A * | 8/1959 | Rankin et al. ............. 106/127.1 |
| 2,968,566 A | 1/1961 | Munch |
| 3,505,082 A | 4/1970 | Miller |
| 3,514,296 A * | 5/1970 | Frank et al. ................. 426/649 |
| 3,782,974 A | 1/1974 | Lontz |
| 3,860,732 A | 1/1975 | Eisenstadt |
| 4,066,799 A | 1/1978 | Cornelius |
| 4,068,006 A * | 1/1978 | Moritz ........................... 426/97 |
| 4,076,846 A | 2/1978 | Nakatsuka et al. |
| 4,216,244 A | 8/1980 | Allen, Jr. |
| 4,243,691 A | 1/1981 | Mohlenkamp, Jr. et al. |
| 4,293,535 A | 10/1981 | Arendt |
| 4,297,375 A | 10/1981 | Shackelford |
| 4,340,614 A | 7/1982 | Pich |
| 4,451,494 A | 5/1984 | Roan, III |
| 4,473,595 A | 9/1984 | Rood |
| 4,486,456 A | 12/1984 | Thompson |
| 4,556,566 A | 12/1985 | Bell |
| 4,556,567 A | 12/1985 | Meyer |
| 4,556,568 A | 12/1985 | Meyer |
| 4,556,577 A | 12/1985 | Meyer |
| 4,556,578 A | 12/1985 | Meyer |
| 4,560,574 A | 12/1985 | Meyer |
| 4,734,290 A * | 3/1988 | Meyer ........................... 426/302 |
| 4,748,027 A * | 5/1988 | Schou et al. ................. 426/96 |
| 4,798,736 A | 1/1989 | Belohlawek |
| 4,873,108 A | 10/1989 | De Rooij et al. |
| 4,915,962 A | 4/1990 | Howard |
| 4,931,305 A | 6/1990 | Karppanen |
| 4,963,387 A | 10/1990 | Nakagawa |
| 5,034,378 A | 7/1991 | Cox |
| 5,064,663 A | 11/1991 | Murray et al. |
| 5,094,862 A | 3/1992 | Bunick |
| 5,098,723 A | 3/1992 | DuBois et al. |
| 5,098,724 A * | 3/1992 | DuBois et al. ................ 426/96 |
| 5,106,632 A | 4/1992 | Wong et al. |
| 5,173,323 A | 12/1992 | Omari |
| 5,213,838 A * | 5/1993 | Sheikh ........................... 426/649 |
| 5,288,510 A | 2/1994 | Gregory et al. |
| 5,447,543 A | 9/1995 | Sadan |
| 5,494,689 A | 2/1996 | Lee |
| 5,562,942 A * | 10/1996 | Koh et al. ..................... 426/649 |
| 5,626,904 A | 5/1997 | Frederiksen |
| 5,853,792 A | 12/1998 | Zolotov et al. |
| 5,871,803 A | 2/1999 | Bonorden et al. |
| 5,897,908 A | 4/1999 | Berglund |
| 6,013,298 A | 1/2000 | Takano et al. |
| 6,030,535 A | 2/2000 | Hayashi et al. |
| 6,048,569 A | 4/2000 | Garcia et al. |
| 6,090,419 A | 7/2000 | Popplewell et al. |
| 6,541,050 B1 | 4/2003 | Bonorden |
| 6,632,467 B1 | 10/2003 | Salvi |
| 6,743,461 B1 | 6/2004 | Vasquez |
| 6,753,023 B2 | 6/2004 | Hammond |
| 6,783,788 B2 | 8/2004 | Kuroda et al. |
| 6,787,169 B1 | 9/2004 | Mäki |
| 6,926,918 B2 | 8/2005 | LeBlanc |
| 7,208,189 B2 | 4/2007 | Ghosh |
| 7,402,328 B2 | 7/2008 | Vasquez |
| 7,452,563 B2 | 11/2008 | Salemme |
| 7,455,872 B2 | 11/2008 | Salemme |
| 7,794,768 B2 | 9/2010 | Dewis |
| 7,820,225 B2 | 10/2010 | Zuniga |
| 7,854,956 B2 | 12/2010 | Zuniga |
| 7,989,016 B2 | 8/2011 | Chigurupati |
| 8,197,878 B2 | 6/2012 | Chigurupati |
| 8,231,924 B2 | 7/2012 | Ganesan et al. |
| 8,231,925 B2 | 7/2012 | Ganesan |
| 8,329,236 B2 * | 12/2012 | Chigurupati ..................... 426/74 |
| 8,372,463 B2 | 2/2013 | Zuniga |
| 8,435,555 B2 | 5/2013 | Minter et al. |
| 8,802,181 B2 | 8/2014 | Grossbier et al. |
| 2003/0008046 A1 | 1/2003 | Gerlat |
| 2003/0175202 A1 | 9/2003 | Mao |
| 2005/0142219 A1 | 6/2005 | Dunuwila |
| 2006/0024422 A1 | 2/2006 | Bakal |
| 2006/0115518 A1 | 6/2006 | Tsuchiya |
| 2007/0059428 A1 | 3/2007 | Chigurupati |
| 2007/0184176 A1 | 8/2007 | Kuroda |
| 2007/0292592 A1 | 12/2007 | Zasypkin |
| 2008/0003339 A1 | 1/2008 | Johnson |
| 2008/0003344 A1 | 1/2008 | Jensen |
| 2008/0008790 A1 | 1/2008 | Jensen |
| 2008/0038411 A1 | 2/2008 | Jensen |
| 2008/0193591 A1 | 8/2008 | Wada et al. |
| 2008/0199595 A1 | 8/2008 | Zasypkin et al. |
| 2009/0041900 A1 | 2/2009 | Zuniga |
| 2009/0104330 A1 | 4/2009 | Zasypkin |
| 2009/0169701 A1 | 7/2009 | Pfeiffer |
| 2009/0196957 A1 | 8/2009 | Vadlamani et al. |
| 2010/0047398 A1 | 2/2010 | Vasquez |
| 2011/0052785 A1 | 3/2011 | Zuniga |
| 2011/0236543 A1 | 9/2011 | Chigurupati |
| 2011/0244103 A1 | 10/2011 | Chigurupati |
| 2012/0003358 A1 | 1/2012 | Vadlamani et al. |
| 2012/0128830 A1 | 5/2012 | Chigurupati |
| 2012/0164287 A1 | 6/2012 | Lundberg et al. |
| 2013/0243924 A1 | 9/2013 | Bhandari |
| 2014/0044846 A1 | 2/2014 | Grossbier |

FOREIGN PATENT DOCUMENTS

| | | | |
|---|---|---|---|
| DE | 3418644 A1 | 11/1985 | |
| DE | 9302125 | 4/1993 | |
| EP | 59363 B1 | 12/1984 | |
| EP | 124254 B1 | 3/1987 | |
| EP | 0183736 B1 | 7/1990 | |
| EP | 417062 B1 | 7/1993 | |
| EP | 536612 B1 | 7/1995 | |
| EP | 441786 B1 | 10/1995 | |
| EP | 0 766 927 A1 | 4/1997 | |
| EP | 0 809 942 A1 | 12/1997 | |
| EP | 1022252 A2 | 7/2000 | |
| EP | 1051086 B1 | 4/2002 | |
| EP | 0 919 137 B1 | 9/2003 | |
| EP | 1933645 A1 | 6/2008 | |
| EP | 2007226 B1 | 7/2010 | |
| EP | 2086354 B1 | 8/2013 | |
| ES | 2302576 A1 | 7/2008 | |
| FR | 2196151 B1 | 10/1975 | |
| GB | 312088 A | 5/1930 | |
| GB | 713803 A | 8/1954 | |
| GB | 911130 | * 11/1962 | ............... C01D 3/22 |
| GB | 1119490 A | 7/1968 | |
| GB | 2237720 B2 | 5/1991 | |
| GB | 2 396 793 A | 7/2004 | |
| GB | 0318152.6 | 7/2004 | |
| IL | 45392 A1 | 7/1997 | |
| JP | 57186460 A | 11/1982 | |
| JP | 62166862 A | 7/1987 | |
| JP | 2004052449 A | 2/2004 | |
| KR | 2007082418 A | 8/2007 | |
| SU | 1375237 A1 | 2/1988 | |
| WO | WO8300081 A1 | 1/1983 | |
| WO | WO9216117 A1 | 10/1992 | |
| WO | WO 95/18546 | 7/1995 | |
| WO | WO 96/17521 | 6/1996 | |
| WO | WO 97/23593 | 7/1997 | |
| WO | WO 98/02051 | 1/1998 | |
| WO | WO 99/18811 | 4/1999 | |
| WO | WO 99/40798 | 8/1999 | |
| WO | WO03053163 A2 | 7/2003 | |
| WO | WO2005086566 A2 | 9/2005 | |
| WO | WO2005094615 A1 | 10/2005 | |
| WO | WO2007032941 A1 | 3/2007 | |
| WO | WO2008043054 | 4/2008 | |

(56) References Cited

FOREIGN PATENT DOCUMENTS

| WO | WO2010119282 A1 | 10/2010 |
|---|---|---|
| WO | WO2012067673 A1 | 5/2012 |
| WO | WO2012093929 A1 | 7/2012 |

OTHER PUBLICATIONS

Jacqueline B. Marcus, R.D., Culinary Applications of Umami, Food Technology, May 2005, p. 24-290, vol. 59, No. 5.
Mary Ellen Kuhn, Strategies for Reducing Sodium in the U.S., Food Technology, May 2010, 34-36, United States.
Barbara Katz & Lu Ann Williams, Salt Reduction Gains Momentum, Food Technology, May 2010, 25-32, United States.
Christopher M. Parry & Johannes Le Coutre, Monkeying Around With Taste, FoodScienceCentral.Com, May 5, 2005, United States.
Nathan Gray, Taste Receptors Understanding May Hold Key for Low-Cal Sweeteners: Review, FoodNavigator.Com, Mar. 3, 2011, United States.
Fidel Toldra & Jose M. Barat, Recent Patents for Sodium Reduction in Foods, Jul. 25, 2008, vol. 1, No. 1, Bentham Science Publishers Ltd., United States.
Thomas Hofmann, Chi-Tang Ho & Wilhelm Pickenhagen, Challenges in Taste Research Present Knowledge and Future Implications.
European Search Report for EP 13181746, dated Sep. 18, 2013, 5 pages.
Notification of Transmittal of the International Search Report and the Written Opinion of the International Search Authority, application No. PCT/US07/80510, mailed Aug. 29, 2008, 9 pages.
'Rosemary Extract', Archive.org dated Sep. 28, 2004, 1 page.
Akerboom, CA 114 7653, Derwent Abstract, 1983, 8 pages.
Understandingfoodadditives.org, Anti-Caking Agents', archive.org, Aug. 25, 2006, 2 pages.
Lawless, H.T., "The taste of calcium chloride in mixtures with NaCl, surcrose and citric acid," Food Quality and Preference [online], vol. 15, 2003, pp. 83-89.
Giffo-Schmitt Beate, International Preliminary Report on Patentability, International Application No. PCT/US2006/034325, issued Mar. 18, 2008, 4 pages.
Notification of Transmittal of the International Search Report and the Written Opinion of the International Search Authority, International application No. PCT/US2013/068564, mailed Feb. 25, 2014, 12 pages.
Thomas Hofmann, Chi-Tang Ho & Wilhelm Pickenhagen, Challenges in Taste Research Present Knowledge and Future Implications, American Chemical Society 2004, Nov. 11, 2003, 24 pages.
Cohen, English Abstract of AR011559, Aug. 30, 2000, 1 page.

\* cited by examiner

LOW-SODIUM SALT COMPOSITION

RELATED APPLICATIONS

The present application is related to and claims priority to PCT Application No. PCT/US2006/034325, filed Aug. 31, 2006, entitled LOW-SODIUM SALT COMPOSITION, which claims priority to U.S. patent application Ser. No. 11/380,522, filed Apr. 27, 2006, entitled LOW-SODIUM SALT COMPOSITION, which claims priority to and the benefit of both U.S. patent application Ser. No. 60/755,125, filed Dec. 30, 2005, entitled LOW-COST SALT SUBSTITUTE and U.S. Pat. No. 60/717,001 filed Sep. 14, 2005, entitled LOW-COST SALT COMPOSITION, the disclosures of which are hereby incorporated herein by reference.

BACKGROUND OF THE INVENTION

Salt, or sodium chloride (NaCl), has been used as a food preservative and a seasoning agent for years and years. In certain cultures, in which prepared foods are widely consumed, salt has become the most widely used seasoning agent, so much so that it is arguably used more than it should be or at least more than might be recommended for maintaining healthy eating practices.

It is generally accepted that eating too much salt is a significant risk factor in developing high blood pressure, itself a cause or contributing factor in the rising incidence of heart disease, one of the world's most deleterious diseases. High blood pressure affects 600 million people worldwide and contributes to 7 million deaths per year, in addition to creating billions of dollars of health care costs relating to complications arising from high blood pressure (HBP) and other cardiovascular conditions.

The medical establishment and the governmental authorities in both the United States and the United Kingdom generally recommend a reduction in per capita salt consumption of from about 10 to 12 g per day, that is believed to be common, to a level of about 6 g per day, which is equivalent to 2400 mg of sodium.

The most recent Dietary Guidelines issued in the U.S. suggest a proposed consumption limit of 2300 mg of sodium per day and the National Academy of Science (NAS) even suggests a more stringent limit of 1500 mg of sodium per day. The NAS also recommends a potassium consumption limit of 4,700 mg per day, while the actual per capita daily consumption of potassium is less than half of that level.

It is generally believed that the major source of sodium consumption is from prepared foods and restaurant meals, which together apparently account for 80% or more of the dietary sodium intake in developed countries. Salt is included in prepared foods and restaurant foods both for taste and for flavor. With the existing technology, past attempts to reduce salt in prepared foods and restaurant foods has found poor acceptance by consumers conditioned by years of eating foods that are relatively high in salt and sodium. Nevertheless, the food industry continues to look for new ways to minimize the amount of sodium in prepared foods and restaurant foods, traditionally seasoned with salt.

A large number of researchers have developed a wide variety of salt substitutes. The classical approach to production of salt substitutes involves combining the sodium and potassium salts, or occasionally magnesium salts, in various ratios and adding a wide variety of other additives to this mix. The other additives are generally added to mask or at least partially reduce the generally metallic/bitter taste of potassium that has generally been associated with salt substitutes containing potassium. The processing techniques used to make these products include, among others, simple blending, agglomeration, extrusion cooking and the like.

The additives, binders or modifiers, as they are variously called, have generally included compounds such as autolysed yeast extracts, hydrolysed proteins and/or amino acids, nucleotides such as disodium inosinate, disodium guanylate and/or monosodium glutamate, ascorbic acid, sugar alcohols, alkali metal gluconates, organic acid/salts, phosphoric acid/salts, brown sugar, dextrins, sugars, modified starches, pre-gelled starches, hydrocolloids, proteins, gums, methylcelluloses, ethylcelluloses, corn syrup solids, starches, maltodextrins, corn syrup solids, high-melting point fats and the like. Most recently, spices/seasonings and flavonoids from fruits and vegetables have also been used.

U.S. Pat. No. 5,094,862 discloses salt substitute granules in which an inner core comprising a nonsweet carbohydrate bulking agent is coated with sodium chloride by either agglomeration or spray drying.

U.S. Pat. Nos. 4,556,566; 4,556,567; and 4,556,568 teach compositions in which a core of potassium chloride is coated with a maltodextrin ('567), a coating mixture of maltodextrin and sodium chloride ('566), and a coating mixture of maltodextrin, sodium chloride and cream of tarter (potassium bitartrate) ('568).

Popplewell et al. (U.S. Pat. No. 6,090,419) report preparing a salt substitute including a masking agent or "binding agent" that is extruded with a combination of sodium chloride, potassium chloride and a suitable plasticizer (e.g. water), then dried and ground in to appropriate particle sizes for use. Binding agents used or suggested by Popplewell et al. include the following type of ingredients, either alone or in combination: dextrins, sugars, modified starches, pre-gelled starches, hydrocolloids, proteins, gums, methylcelluloses, ethylcelluloses, corn syrup solids, and high-melting point fats. Cross-linking binding agents such as alginate with calcium ions, onion granules/powder, garlic granules/powder, capsicum granules/powder and spices are also reported as possible binding agents.

One of the drawbacks of these compositions, however, is the relatively high cost of the "masking" or "binding" agents, the limited ability of the masking that it provided and further taste or color changes attributable to the binding agent. Another drawback is that processing the sodium chloride with the modifier results in masking the sodium chloride's "salty flavor" as well as the bitter/metallic flavors of the potassium chloride.

These patented formulas/mixtures have advanced the state of the art for salt substitutes, although none of them have achieved parity with respect to the taste of simple salt. Most of the patents disclosing these formulas do not disclose independent sensory evaluations. While some masking of potassium has been achieved in some of these formulas, in many cases a new 'flavor' has been introduced (the flavor of the additive itself), thereby limiting the number of acceptable uses of the particular salt substitute. A prime example is savory flavor contributed by yeast extract and/or amino acids. All of these not only created complexity but also added to the cost of the final product. Therefore, some of these formulations/end products are extremely high priced in comparison to common salt. Thus, there is still room for improvement both in terms of sensory and price/value—to achieve commercial acceptability by the consumers. The technology we have described here addresses both the cost and sensory issues.

Thus, there remains a need for salt substitutes which do not have the drawbacks mentioned above. Because salt and any substitutes therefore are essentially treated as commodity products within the food industry, cost of preparation is a significant factor that relates directly to cost effectiveness of any resulting product of any process for making salt substitutes that are used as substitutes for common salt. Specifically, there remains a need for a salt substitute which does not have off-flavors, has a similar appearance to salt, and is easy and inexpensive to make. There also remains a need for a simple process for preparing such a salt substitute.

SUMMARY OF THE INVENTION

The preferred salt composition or salt substitute of the present invention includes sodium chloride, potassium chloride, rice flour and citric acid in which the weight ratio of sodium to potassium is from about 0.1 to about 9, preferably from about 0.4 to about 3, more preferably from about 0.6 to about 1.5 and most preferably about 1.0. This salt composition or salt substitute can be used to replace table salt in order to reduce sodium content. In preferred embodiments, it is made in a two-step process. In Step 1, an aqueous mixture is created by combining potassium chloride (from about 45 to about 85% by weight of dry mix), rice flour (from about 10 to about 20% by weight of dry mix), and an acidulant, preferably citric acid (from about 0.5 to about 3% by weight of dry mix) in appropriate sequence in boiling water (from about 50 to about 60% by weight in liquid matrix). The aqueous slurry or mixture is further heated to a desired consistency/viscosity and then drum dried under optimum conditions (described in detail in the Examples 3-5). This step, Step 1, produces a Modified Potassium Chloride ("MPC") that is generally free of the typical bitterness associated with potassium chloride and is also generally free of savory or other foreign flavors. In Step 2, the MPC is then blended with sodium chloride in a desired weight ratio of sodium to potassium and ground to produce any desired particle size. Further, silicon dioxide may be added as an anti-caking agent. For example, a 50/50 blend of MPC and sodium chloride provides a salt composition that is 20% by weight of each of sodium and potassium. For reference, pure sodium chloride is 40% by weight of sodium and pure MPC is 40% by weight of potassium.

While the preferred method to produce MPC is drum drying, due to its efficacy and low capital/operating costs, the present invention also includes MPC made by extrusion cooking of a blend containing potassium chloride and rice flour, preferably in a ratio of 1:1. Citric acid may also be added, but is not essential. Then the extruded mixture is ground and then either co-processed with sodium chloride (NaCl), as described above, or ground and then blended with NaCl. In alternate embodiments, MPC can be made by and agglomeration process discussed below.

The two-step process of processing the potassium chloride, separate of the sodium chloride is very desirable, since such a process does not include a step that subjects sodium chloride to an unnecessary processing step, and therefore, preserves the natural taste of the sodium chloride and also reduces processing costs. In addition, the co-grinding of MPC with sodium chloride further aids in improving the taste of the final salt composition, by limiting the degree to which the processing might diminish the saltiness of the NaCl.

The present invention, in its broadest application, includes a salt composition or salt substitute including a modifier, preferably a cereal flour, most preferably a rice flour; sodium chloride and potassium chloride; the salt composition preferably including from about 1 to about 80 percent by weight (% by wt) of cereal flour, from about 10 to about 90% by wt of sodium chloride and from about 2.5 to about 80% by wt of potassium chloride. In preferred embodiments the salt composition will include from about 5 to about 20% by wt of a modifier, preferably cereal flour, from about 40 to about 60% by wt of sodium chloride and from about 30 to about 50% by wt of potassium chloride. The salt composition can be made by a process including the steps of mixing of an amount of water and a dry mixture including preferably from about 1 to about 70% by wt of cereal flour, preferably rice flour, from about 10 to about 90% by wt of sodium chloride and from about 2.5 to about 80% by wt of potassium chloride; more preferably from about 5 to about 20% by wt of cereal flour, from about 10 to about 90% by wt of sodium chloride and from about 2.5 to about 80% by wt of potassium chloride, to form a mixture and processing the mixture either by drum drying the mixture or using an extruder.

In preferred embodiments as also described above, the mixture is processed in a drum drier because it is efficacious and the capital and energy costs are lower and the temperature, to which the mixture is exposed, is generally lower, reducing the degree to which the final product tastes even a "little bit" burnt. Preferred embodiments will also include a masking agent comprising a food grade acidulant and a modifier. In the preferred method of making the present salt composition, the cereal flour, or perhaps in this case even a cereal starch or a combination thereof, is used as a modifier to mask the off-flavors of KCl alone and the masked KCl in the dried mixture is then co-ground with NaCl that has not been previously mixed with the modifier. The KCl/masking agent mixture is prepared as described above, but the NaCl is just left out. After the hot mixture is cooled, it is then co-ground with the NaCl to yield the finished salt composition. Alternatively, NaCl may be blended with the ground KCl/masking agent mixture. In preferred embodiments, the salt composition of the present invention will include a modifier, sodium chloride and potassium chloride; the salt composition preferably including from about 1 to about 75 percent by weight (% by wt) of the modifier, from about 10 to about 90% by wt of sodium chloride, more preferably from about 25 to about 75% by wt of sodium chloride, even more preferably from about 40 to about 60% by wt of sodium chloride, and preferably from about 2.5 to about 80% by wt of potassium chloride, more preferably about 10 to about 60% by wt of potassium chloride, even more preferably about 30 to about 50% by wt of potassium chloride, wherein the sodium chloride is substantially in crystalline form and the potassium chloride is substantially in a non-crystalline form in which potassium ions and chloride ions are substantially disassociated from one another and in close association with the modifier.

These processes surprisingly produce a suitable salt composition or salt substitute without a need for using any other additives/masking agents/inhibitors commonly employed in prior art salt substitutes. In the most preferred embodiments of the present invention as described above, the weight ratio of sodium to potassium will be generally about 1:1; however, in other embodiments, the ratio may be about 1:2 or as much as 1:4, depending on the KCl/NaCl ratio desired in the final product.

In preferred embodiments, the low-sodium salt composition will be made in a two step process. One of these preferred processes includes first making modified potassium chloride by mixing from about 45 to about 85% by wt potassium chloride, most preferably about 82% by weight potassium chloride, from about 10 to about 20% by wt of rice flour, most preferably about 16.5% by wt, from about 0.5 to about 3.0% by wt of citric acid, most preferably about 1.5% by wt of citric acid, and a variable amount of water to form a mixture. Then the mixture is heated and then drum dried. In the second step, the modified potassium chloride is either co-ground or mixed with from about 10 to about 90% by wt of sodium chloride, most preferably about 50% by wt. This process results in a final salt composition comprising from about 10 to about 90% by wt of sodium chloride, most preferably 50% by wt of sodium chloride, from about 2.5 to about 80% by wt of potassium chloride, most preferably 40% by wt of sodium chloride, from about 1 to about 75% by wt of rice flour, most preferably 8% by wt of rice flour, and from 0.1 to about 5% by wt of citric acid, most preferably about 1% by wt of citric acid. Additionally, 0.1 to about 2% by wt of silicon dioxide may be added to prevent caking, most preferably about 1% by wt of silicon dioxide.

Another of these preferred processes includes first making Modified Potassium Chloride (MPC) by mixing from about 25 to about 75% by wt potassium chloride, most preferably about 50% by weight sodium chloride, from about 25 to about 75% by wt of rice flour, most preferably about 50% by wt, from 0.1 to about 5% by wt of citric acid, most preferably 1% by wt of citric acid, and a variable amount of water to form an aqueous mixture. Then the aqueous mixture is extruded to form the MPC. In the second step, the modified potassium chloride is either co-ground or mixed with from about 10 to about 90% by wt of sodium chloride, most preferably about 50% by wt. This process results in a final salt composition comprising from about 10 to about 90% by wt of sodium chloride, most preferably 50% by wt of sodium chloride, from about 2.5 to about 80% by wt of potassium chloride, most preferably 40% by wt of potassium chloride, from about 1 to about 75% by wt of rice flour, most preferably 8% by wt of rice flour, and from about 0.1 to about 5% by wt of and acidulant, preferably citric acid, most preferably about 1% by wt of citric acid. Additionally, 0.1 to about 2% by wt of silicon dioxide may be added to prevent caking, most preferably about 1% by wt of silicon dioxide.

The above-described features and advantages, along with various other advantages and features of novelty are pointed out with particularity in the claims of the present application annexed hereto and forming a part hereof. Other aspects and advantages of the invention will become apparent from the following description, illustrating by way of example, principles of the present invention.

DETAILED DESCRIPTION OF THE INVENTION

Figure 1:
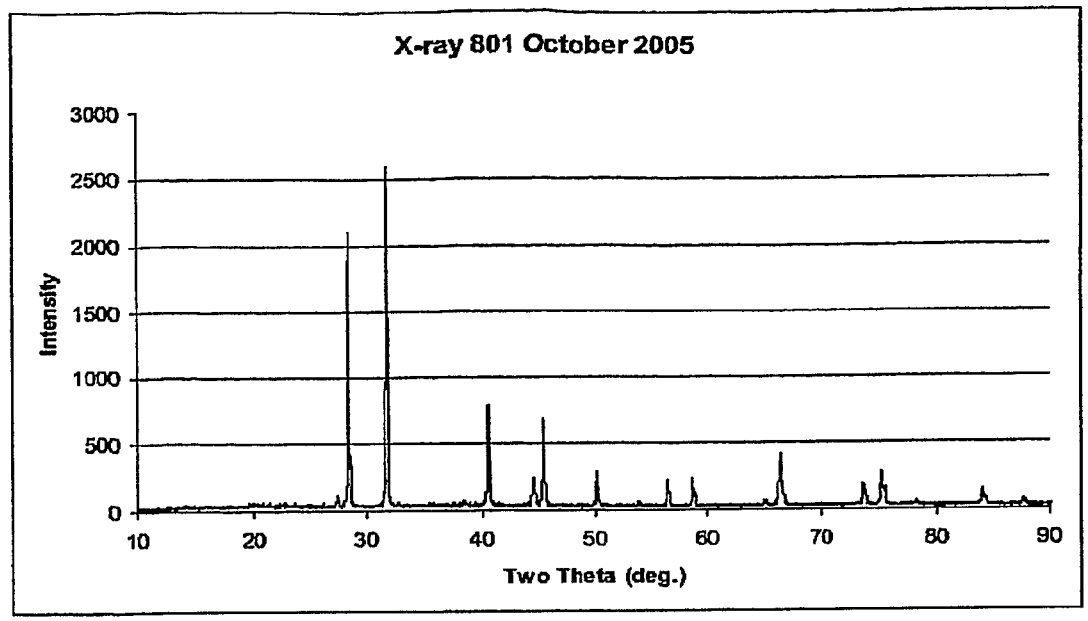
FIG. 1 is a representation of a data readout from an X-ray diffractograms for sample 801.

The present invention has several different aspects that were developed sequentially during a continuing development process, the goal of which was to address the health concerns associated with sodium consumption by developing a novel, healthful and cost effective salt composition or salt substitute that could be used in the place of table salt to provide consumers with a suitable salt taste while reducing the amount of sodium in any food in which the salt composition is used, as compared to the sodium content in such food when table salt is used.

Definition of Terms:

As used herein, the following terms have the following meanings. The word "salt", unless it is modified by another word (e.g. reduced-salt, potassium salt, calcium salt and the like) or used itself to modify another word (e.g. salt substitute, salt composition and the like), means sodium chloride (NaCl) in such form that would make it suitable for use as a seasoning agent on or in food. The term "salt substitute" means a seasoning or other agent that is used as a substitute for salt. The term "salt composition" means a composition that includes salt, but also will include constituents other than salt, while still imparting seasoning characteristics similar to those seasoning characteristics of salt and therefore, providing such composition with the ability to become a substitute for salt.

Choosing a Modifier and a Process:

In the initial phases of this development process, common salt (NaCl) was mixed with potassium chloride (KCl) and a modifier which either contains or is mixed into an aqueous medium. The modifier is added to attempt to mask the bitter or metallic off-flavor generally associated with KCl and add bulk. Initially the modifier was milk (skim or whole), and then buttermilk was tried. Other modifiers, as discussed below, included autolysed yeast and/or amino acids such as L-Lysine Monohydrochloride. The mixture is dried and the resulting product is ground to produce the resulting salt composition. The processing step for these compositions involved spray drying. These studies were abandoned however, due to a cooked milk flavor that was created in the process as well as due to savory notes contributed by the autolysed yeast and amino acids.

Subsequently, a number of starch products were used as modifiers. At the same time, a number of cereal flours were tried as modifiers as well. In these trials, the processing step involved extrusion cooking and drying. During this phase of the development process it was determined that cereal flours, particularly rice flour, proved to be especially good modifiers. First of all, cereal flours are generally less expensive than the isolated starch products that are generally isolated from cereal grains or other plants such as, for example, potatoes. In addition, it is believed that the remaining constituent in flour, that would be removed when starch is isolated, is effective to assist in the flavor masking proved by the modifier. Therefore, the flour products, especially rice flour, which is non-allergenic and is more effective with respect to enhanced flavor masking and process ease.

Further studies were conducted by using short time/high temperature extrusion cooking processes and employing potato starch as a modifier. The potato starch proved to be a difficult modifier to extrude and it is also considered to be quite expensive relative to other modifiers.

Following these efforts, the present inventors concluded that using some less expensive modifiers such as various cereal flours and found that they worked quite well in the extrusion cooking process, and noted the rice flour was a surprisingly effective modifier, most notably because of the especially clean taste and white color of the finished product. In addition, the finished product was able to support a relatively high potassium to sodium ratio in the salt composition without imparting any bitter aftertaste. Furthermore, rice flour is believed to be non-allergenic, thereby reducing one more impediment to success in the marketplace. Insofar as the present invention was especially inexpensive due to the low cost of cereal flour as compared to other modifiers that have been used by others, and insofar as the cereal flour modifiers are believed to be relatively easy to use, and insofar as the preferred product utilizing rice flour as a modifier had a surprising clean taste and an appealing white color, the present inventors believed they had discovered and excellent salt composition to substitute for normal table salt and for commercial salt used in product formulation in the food industry. The non-allergenic nature of the preferred end product that employs rice flour as a modifier, was believed to be a further enhancement that will allow the preferred salt composition of the present invention to become used in a wider variety of circumstances than perhaps other salt compositions of the present invention using cereal flour modifiers arguably have a less non-allergenic nature than the rice flour that is preferred. As used herein, a ratio of sodium to potassium or a ratio of potassium to sodium in a weight ratio.

It will be appreciated in this regard that cereal flours are very inexpensive. They are made simply by dry milling cereal grains. Cereal starches on the other hand are generally quite a bit more expensive primarily because starches are generally obtained through much more involved extraction processes that are believed to add significantly to the cost of cereal starches. It will also be appreciated that simple cereal flours are quite different from the more refined cereal starches, which may allow for a greater ease of use in extrusion processes than is anticipated for cereal flours.

Furthermore, it is believed that the materials removed from the cereal flours, when they are processed to make starches, especially the proteins fraction, assist significantly in masking off-flavors generally associated with KCl. For that reason, cereal flours are equivalent to a similar cereal starch to which a protein fraction is added, essentially adding the fraction that was removed, back to the purified fraction.

It is envisioned that rice flour is the preferred cereal flour. Other flour, including wheat flour, oat flour, rye flour, corn flour, bulgur flour, barley flour and the like, or combinations thereof, can also be used in alternate embodiments of the present invention.

In certain embodiments of the present invention, especially embodiments where the KCl is processed in a drum drying process, while cereal flours are preferred, cereal starches can be used effectively even though the additional masking capability derived from the protein fraction, and other fractions generally removed from processed cereal starches, are not present.

It is envisioned that rice starch is the preferred cereal starch. Other starches, including wheat starch, oat starch, rye starch, corn starch, bulgur starch, barley starch and the like, or combinations thereof, can also be used in alternate embodiments of the present invention.

Immediately below is a comparison that shows how different the flours are in comparison to the starches. The differences are, nevertheless, sufficient to show the significant difference between simple flours and the more complex starch products which evidence significant refinement as compared with flours.

Comparison of Typical Rice Flour vs. Typical Rice Starch

|  | Rice Flour | Rice Starch |
| --- | --- | --- |
| Moisture (% by wt) | 8-13.0 | 8.0-12.0 |
| Starch (% by wt) | 72.0-78.0 | 85.0-91.0 |
| Protein (% by wt) | 6.0-9.0 | 0.3-0.5 |
| Fiber (% by wt) | 3.0-5.0 | 0.2-0.5 |
| Ash (% by wt) | 0.3-1.0 | 0.2-0.5 |
| Fat (% by wt) | 0.5-1.0 | 0.2-0.5 |

Although protein, fiber, ash and fat are present, essentially as impurities in starches that are reported as available in the industry, there is a "natural" rice extract product, available from California Natural Products, which is reported to be a waxy rice starch. It is really not a "true" starch as starches are presently known in the industry, primarily because it has a very high protein content (reportedly 6.0%). A starch can be separated primarily into two fractions—amylose and amylopectin. Natural starches are mixtures of amylose (10-20%) and amylopectin (80-90%). To the degree that they remain in a starch, they are impurities that can be removed by further extraction. When a cereal grain product is only minimally extracted, it really is not accurate to say that it is a starch. As noted above, a starch is mixture of two fractions—amylose and amylopectin, although some level of protein, fiber, ash and fat impurities may remain, products having more than trace amounts of these impurities are really just grain extracts. It will be appreciated that it is believed that standard rice starches and starch-derivatives such as maltodextrins and the like, preferably have protein contents generally below about 0.5%, whereas cereal flours generally have at least 10 to 30 times more protein content (e.g. generally from at least about 6 to about 15% by weight of protein).

While rice flour is the preferred cereal flour, other cereal flours, including wheat flour, oat flour, rye flour, corn flour, bulgur flour, barley flour and the like, or combinations thereof, can also be used in alternate embodiments of the present invention. Rice flour appears to the present inventors to be somewhat superior to other flours, due to the high degree of whiteness of the present preferred salt composition. All of the flours, however, are desirable primarily because of their low cost and their projected effectiveness in masking or minimizing the bitterness of the "metallic" aftertaste generally associated with prior art salt compositions containing potassium chloride.

It is speculated by the present inventors, that the specific protein in the respective flours may have an associative effect upon the potassium chloride, which effectively reduces or masks this bitter/metallic aftertaste and, is therefore, a more effective modifier.

X-Ray and DSC Experiments to Compare Products Made by Extrusion Cooking with Rice Starch Vs. Rice Flour as Modifiers Two samples of salt compositions made with two different modifiers, rice flour (sample 801) and rice starch (sample 803), were made according to the method described in Example I (discussed below), except that an equal amount of rice starch was substituted for rice flour in sample 803, and each of the two samples were tested to determine if sample 801 differed from sample 803.

Figure 2:
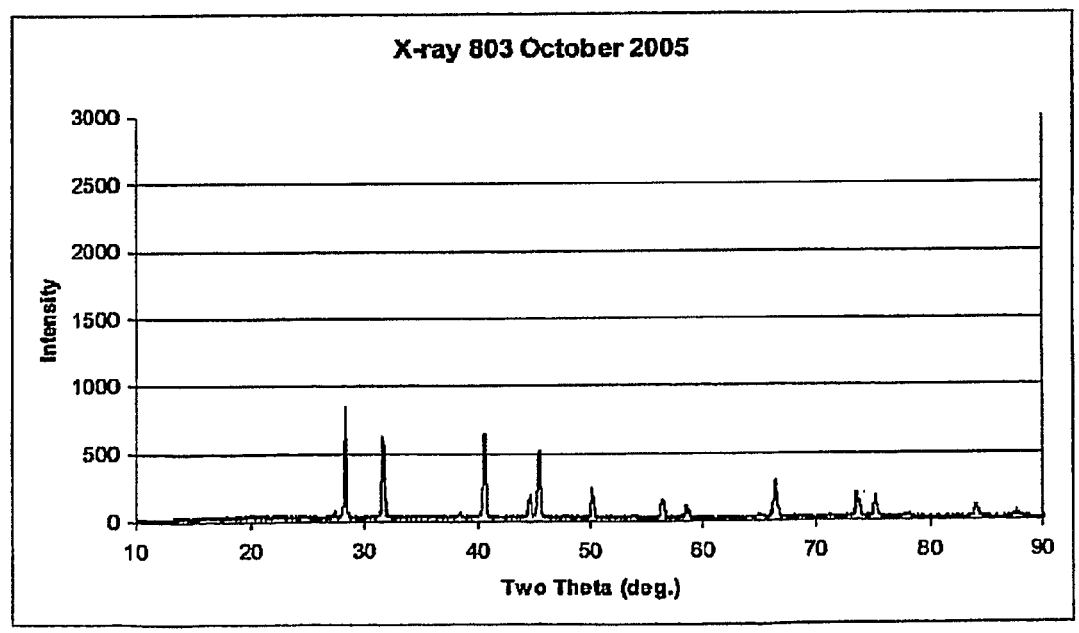
FIG. 2 is a representation of a data readout from an X-ray diffractograms for sample 803.

X-ray and DSC experiments were conducted on the two samples at the Whistler Center for Carbohydrate research in the Department of Food Science at Purdue University, West Lafayette, Ind. The laboratories findings were as follows: The X-ray studies for samples 801 and 803 generated the X-ray diffractograms illustrated in FIGS. 1 and 2, respectively, that are reported to indicate that both samples are predominately microcrystalline. The starch profile (2 theta domain, 10 to 27° F.) of sample 803 is reported to be extremely low as it is dwarfed by the remaining profile at 28° F. and up, scattered mainly by the significant amount of added common salt in the respective samples. Based on these studies, the researchers conducting the study concluded that it appears that sample 801 is different than sample 803.

Figure 3:
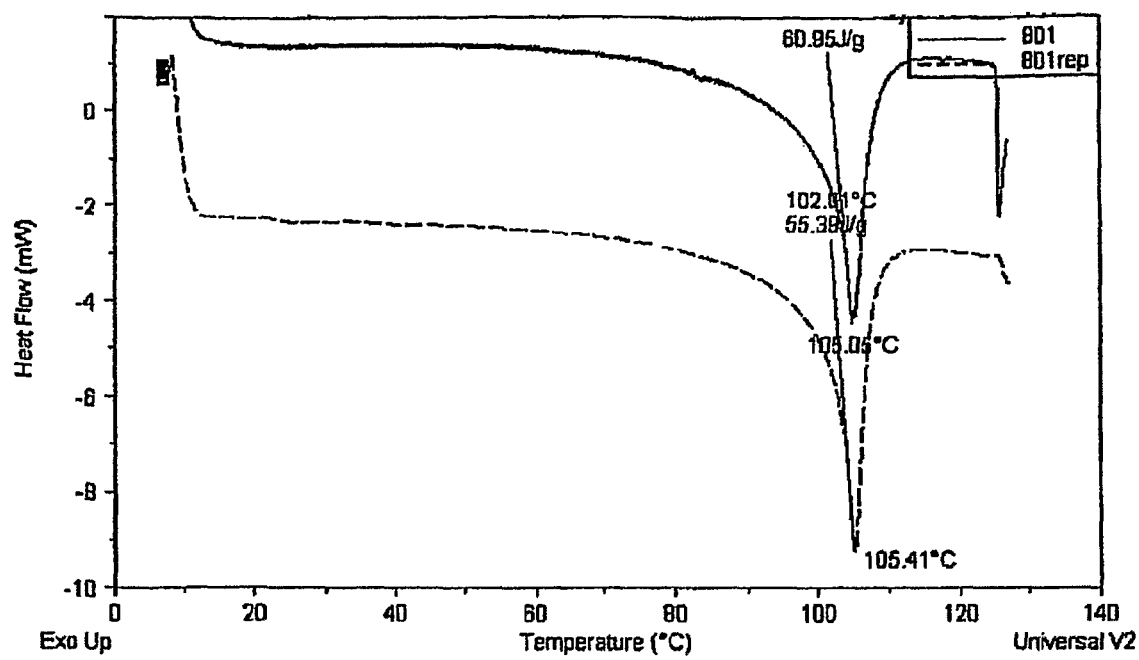
FIG. 3 is a representation of a data readout for duplicate DSC thermograms for sample 801.
Figure 4:
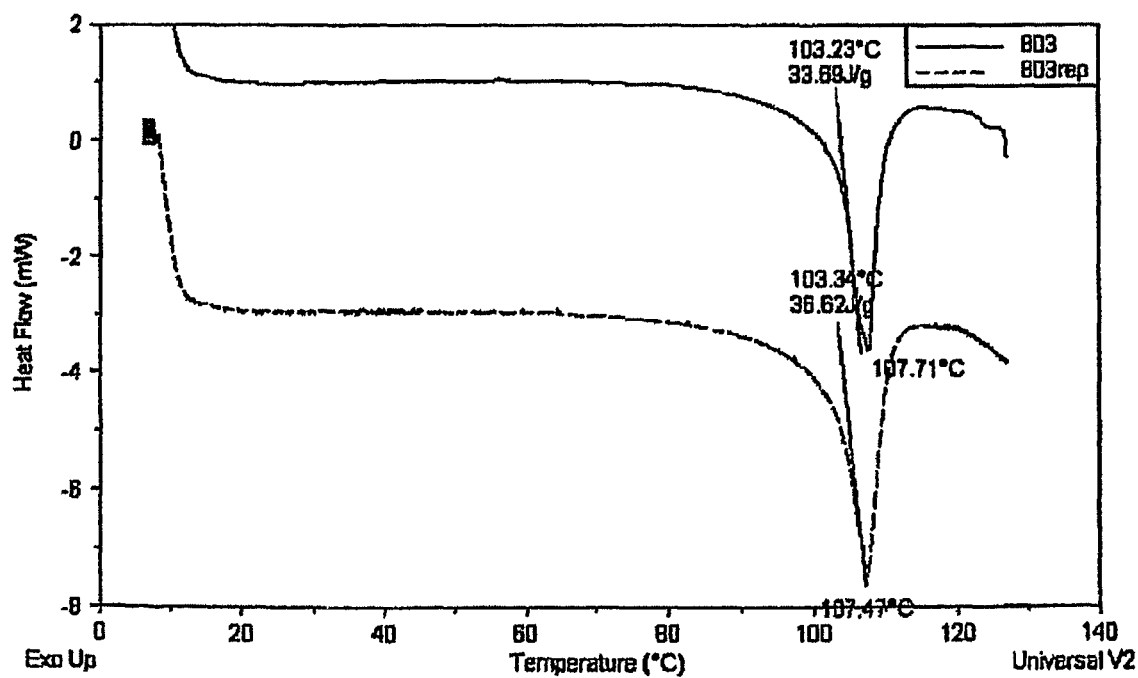
FIG. 4 is a representation of a data readout for duplicate DSC thermograms for sample 803.

The DSC studies generated the duplicate DSC thermograms illustrated in FIGS. 3 and 4, for samples 801 and 803, respectively. These results reported to indicate that both samples exhibit only one endothermic peak at about 105 to about 107° C. The enthalpy of the sample 801 was 57 joules per gram, which was much higher than the enthalpy of sample 803, which was 35 joules per gram. For this reason, it is believed that the fine rice flour that is used as a modifier in sample 801, is preferable as a modifier to the rice starch which is used in sample 803. The two samples exhibit distinct X-ray and DCS characteristics suggesting that the amount and nature of the constituent ingredients are not identical, which reflects on their physical properties.

Based on the example above, it is believed that one could use other cereal and/or vegetable flours as modifiers, even though rice flour is the most preferred due to its unique potassium off flavor masking capability, its non-allergenicity, its whiteness in color and its blandness in flavor. The present inventor was both pleased and surprised that rice flour, in its simplest form, masked all of the anticipated bitter or metallic tastes often associated with salt substitutes especially those including potassium salts.

Processing NaCl with KCl vs. Processing Only KCl:

Further experiments with processing led the present inventor to an inquiry as to whether the modifier or masking agent need be mixed with NaCl when preparing salt compositions of the present invention. This question was tentatively answered when experiments were run in which only potassium chloride (KCl) was mixed with the masking agent and then drum dried. The resulting dried product was then co-ground/milled with NaCl. Alternatively, the resulting dried product can be ground and then blended with common salt. It is believed that the processing of only the KCl with the masking agent by drum drying, or by extrusion cooking or agglomeration, enhances the flavor of resulting preferred low-sodium salt compositions of the present invention by retaining the sodium chloride or salt in its native, unmasked state. Furthermore, this process is more cost effective, because the amount of total mix to be dried is reduced by eliminating one of the major components of the final product, common salt, from the initial mix that must be dried.

Further consideration was then given to when to mix the NaCl with the KCl. At this time, it was determined that the resulting salt composition might be less costly and more effective if the NaCl and the KCl were not processed together and the masking agent was only used to mask the metallic flavor associated with the KCl. The KCl is mixed with the masking agent and then dried.

Subsequently, the dried KCl containing mixture, in which only the KCl off-flavors are masked, is ground and subsequently blended with salt. In preferred embodiments, the dried KCl containing mixture is co-ground with salt to yield the preferred salt composition. It was immediately perceived that the following was a novel idea: using the masking agent or modifier alone to mask only the off-flavors and bitter notes associated with KCl and not the saltiness associated with the NaCl.

Processing the KCl alone, reduces the cost of processing at the same time that it is believed it will better preserve the saltiness associated with the NaCl. Therefore, both the cereal flour containing salt composition of the present invention and the co-ground salt composition of the present invention, both disclosed herein, are believed to be novel and patentable inventions.

In preferred embodiments of the present invention, where the KCl is processed to make Modified Potassium Chloride (MPC), in which the KCl becomes associated with any of the modifiers of the present invention and the NaCl is only added in after the KCl is processed with the modifier. In these embodiments it is believed, but not relied upon, that the KCl will be substantially in a non-crystalline, amorphous matrix in which the potassium ions and the chloride ions that make up KCl are substantially disassociated and dispersed within the non-crystalline, amorphous matrix, while NaCl will be substantially in a crystalline form in which the NaCl is substantially organized in a crystal lattice in which sodium ions are substantially in close association with chloride ions in a series of repeating "building blocks" that are bound together to form the crystal lattice. This is believed to result from the processing of the KCl with the modifier in the presence of water that allows the potassium ions, and the chloride ions of the KCl, to disassociate from each other and substantially reassociate with the modifier in a non-crystalline, amorphous matrix, while the NaCl is unprocessed and generally does not disassociate, but remains in crystalline form when it is mixed with MPC to form the preferred low-sodium salt composition by blending, cogrinding or any other appropriate method of mixing. As noted elsewhere, the NaCl can be blended with MPC, co-ground with MPC or mixed in any other manner in which dry ingredients are generally mixed.

In preferred embodiments, the modifier will include a cereal flour, preferably a rice flour (whose benefits are explained previously), in an aqueous mixture that can preferably include a food grade acidulant, such as any food grade organic acids and/or natural products including organic acids, such as citric acid, tartaric acid, acetic acid, malic acid, fumaric acid and/or their derivatives, as well as natural sources of such acids or the like, that will lower the pH of any aqueous solution in which the salt compositions of the present invention may be at least partially dissolved. This is believed to reduce the degree to which any metallic and/or other off-flavor associated with the KCl in the composition, perhaps because of the unique structure of the MPC in the final salt composition.

Salt Choices:

Chloride salts employed further alternate embodiments of the present invention may be a single compound, such as a chloride of Na, K, Mg, Ca, or perhaps a mixture of two or more of these chloride salts. It is possible, and in some cases desirable, to employ mixtures of halide salts, wherein the halide of one or more of the salts is a different halide than that of the chloride salts. A halide is a binary compound, of which one part is a halogen atom (e.g. fluorine, chlorine, bromine or iodine) and the other part is an element or radical that is less electronegative than the halogen, to make a fluoride, chloride, bromide or iodide compound. Many salts are halides. All Group 1 metals form halides with the halogens that are white solids.

Other chloride salts, such as calcium chloride, magnesium chloride, lithium chloride and ammonium chloride may also be employed in the present invention, with the preferred salts being NaCl and KCl. Commercial use of the different types of salts is further restricted for use in the United States to those substances having FDA approval. Other salt compositions may also be used in alternate embodiments including cationic salts of lactates and the like.

Acidulants:

Preferred embodiments of all of the salt compositions and salt substitutes of the present invention will include a food grade acidulant, preferably from about 0.01 to about 1.0% by weight of such an acidulant. Preferred food grade acidulants for the present formulations include food grade acids such as citric acid, malic acid, tartaric acid, fumaric acid, lactic acid, acetic acid, benzoic acid and the like; preferably citric acid. It will be appreciated that fruit extracts, such as natural citrus juices contain citric acid and may therefore also be used. It is believed that using an acidulant to lower the pH of the aqueous mixtures present in the various processing steps, increase the relative solubility of KCl. In preferred embodiments the acidulants will reduce the pH of the aqueous mixtures, thereby acidifying these mixtures and/or the aqueous portions of such mixtures preferably to a pH of from about 3.0 to about 5.0, more preferably from about 3.5 to about 4.5, more preferably to a pH of about 4.0.

Processing Procedures:

Extrusion Cooking vs. Drum Drying:

Subsequently, efforts were directed to developing less expensive processing procedures and the respective mixtures using masking agents or aqueous mixtures of flour as modifiers for NaCl and KCl were tried. It was found that drum drying was especially effective and project cost was significantly less that it is believed it would be for extrusion cooking. The drum drying temperature is preferably from about 150 to about 350° F., more preferably from about 160 to about 300° F., even more preferably from about 170 to about 250° F.

Following initial studies using drum dryers, it was determined that this method of processing the mixture of salt and modifier or masking agent was at least as effective at providing a finished salt composition, in which the metallic off-flavor associated with potassium is masked as well or better as extrusion cooking and drum drying is believed to be much more cost effective than extrusion cooking. Flour modifiers are particularly effective when used in both drum drying as in extrusion drying procedures. Starches are substantially as effective in drum drying, although flours are preferred, as discussed above.

Utilization of extrusion cooking to process certain salt compositions of the present invention, provides a continuous reactive processing method of production. The reactive extrusion of the salt composition begins with the flow of dry blended ingredients from a hopper into the extruder. There, intermeshing side-by-side augers mix the ingredients and allow them to react under rapidly changing pressures and temperatures inside the extruder. Besides being versatile, reactive extrusion is continuous and generally more energy-efficient and effective than batch cooking. Extrusion combines thorough mixing capability, high shear, elevated pressures, and elevated temperatures to subject the formulation and its constituent molecules to almost instantaneous treatments. Extrusion technology allows ingredients with little or no water to be melted and broken into molecules or mixed and reacted with other materials. The pressures generated can rise to 350-3000 psi, causing the internal temperature to rise above the normal boiling point of water without the production of steam or loss of moisture. Under such conditions, cereal-based food ingredients will heat to 100-200° in less than a few seconds and convert to a homogeneous plasticized mass.

The basic extruder layout includes a platform that supports a drive system, barrels, screw elements on a screw shaft, and a connection to utilities and controls. A conditioning cylinder is often included to introduce water into the dry ingredients and allow for pre-hydration of the ingredients prior to the extrusion barrel. Water can further be introduced into the barrel through injection ports, the injection port can be single or multipoint. The extruder barrel is a flanged cylinder that surrounds the extruder screws. It can withstand relatively high pressures and has sufficient structural rigidity to minimize sagging or deflection. The extruder barrel can be cooled or heated externally or internally with air or liquid, usually water, steam, or oil.

Co-rotating and intermeshing screw elements are common for mixing applications because they have a self-wiping action and provide a high degree of mixing and positive conveying. Depending on the element's design, screws can convey, mix, or knead the material. The elements are available in various lengths, pitch sizes, and configurations to accommodate variability among powders (e.g., bulk density, flow, material slippage). Designs may be single or multi-flighted. The number and location of the screw elements help define the processing ability, parameters and final functional qualities of the finished product.

As used herein, mesh size refers to standard U.S. Sieve Sizes, percents refer to weight percents, and ratios refer to weight ratios. A mesh size range of, say, 8 mesh to 100 mesh means the particles fall through an 8 mesh screen and are retained on a 100 mesh screen; a mesh size of −100 mesh means the particles pass through a 100 mesh screen.

It is noted that rice flour occurs naturally in plants in the form of granules having an average size of 5-100 microns, with thousands of individual rice starch molecules tightly bound together. It is believed, but not relied upon, that extrusion of the preferred mixture of the present invention including rice flour may do something to the rice flour causing it to encapsulate potassium cations, thereby limiting the bitter characteristics of the potassium chloride associated with other salt compositions/substitutes and also, at the same time, this method enhances the "salty" characteristics of the sodium chloride present in the final product. Extrusion may also allow the rice flour to be able to be solubulized in cold water, enhancing the rapid solubility of the preferred embodiment of the present invention.

Agglomeration as an Option to the Drum Drying Process to Produce Modified Potassium Chloride:

In an alternate process of the present invention, an agglomeration procedure is used to make the present salt composition. This procedure preferably involves a Rewet agglomeration system, wherein a dry mixture of potassium chloride, rice flour and citric acid are conveyed to an agglomeration chamber. The powdered mixture is dispersed in air and brought into contact with water that is sprayed into the chamber to form a dispersed mixture. The moisture content of the dispersed mixture is preferably from about 5 to about 25%, more preferably from about 10 to 20%, most preferably about 15%. Subsequently, porous agglomerates are formed, which then are dried under fluidization conditions preferably at a temperature range of from about 150 to about 250 degrees F., more preferably from about 175 to about 225 degrees F., most preferably at about 200 deg F., for a period of preferably about 20 to 60 minutes, more preferably from about 30 to about 50 minutes, most preferably about 40 minutes or less. After drying, the agglomerates are cooled to room temperature, discharged from the chamber and classified to remove the fines, which then are recycled. The end product is a coarse particle containing the components of Modified Potassium Chloride. It will be appreciated that one can adjust the final agglomerate size, by varying the wetting rate and drying conditions.

Although agglomeration can be used to make both the Modified Potassium Chloride and the Salt Compositions of the present invention in any number of different formulations using similar procedures, extrusion cooking is a more preferred drying process for the reasons stated above and drum drying is even more preferred.

The following example (Example 1, below) illustrates a preferred extrusion cooking process for making alternate salt compositions of the present invention.

EXAMPLE 1

Extrusion Cooking to Make Modified Potassium Chloride ("MPC")

1. Blending dry ingredients including preferably from about 25 to about 75% by wt of cereal flour, preferably rice flour, from about 25 to about 75% by wt of KCl;
2. Feeding the blended dry ingredients into an extruder along with a suitable amount of moisture and extruding the mixture at a temperature of from about 150 to about 350 degrees F., preferably 210 to 280 degrees F. at a pressure of from about 300 psi to about 500 psi to plasticize the mixture into an amorphous plasticized mass and extruding the amorphous plasticized mixture from the extruder;
3. Drying the amorphous plasticized mixture to reduce the moisture content of the mixture; and
4. Breaking the dried mixture into a desired particle size for suitable hydration, solubility, blendability and adherence.

The above process results in a Modified Potassium Chloride (MPC). This MPC may then optionally be blended with sodium chloride or alternatively, co-ground with sodium chloride to produce a low-sodium salt composition of the present invention.

EXAMPLE 2

Extrusion Cooking to Make a Low-Sodium Salt Composition

A Wengar TX-57 extruder was used to produce a preferred low-sodium salt composition of the present invention. The extruder had a twin screw extrusion barrel and an extrusion die having two inserts with an inside diameter (ID) of 4.5 mm and two inserts having a land length of about 6.0 mm.

The following dry ingredients were blended in a mixing bowl using the following formulation:

| | | |
|---|---|---|
| 1. | Sodium chloride (Cargill Top Flo Evaporated Salt) | 25% |
| 2. | Potassium chloride (Nutri-K, Rhesis Inc.,) | 25% |
| 3. | Rice Flour (Sage V Medium grain) | 50% |

The dry blend was fed into a pre-conditioning cylinder of the extruder via a "loss-in-weight" feeder at a rate of 60 kg/min and a feed-screw speed of 10 rpm. In the pre-conditioning chamber, water was added to the dry blend through an injection port to achieve 13.8% moisture content (dry weight basis). The pre-conditioning cylinder speed was 150 rpm and the water flow was 0.138 kg/min. The pre-conditioner discharge temperature was 72° F. (22° C.). No steam was added to the pre-conditioner. The mixture was then conveyed into the throat of the twin-screw extrusion barrel and heated to a temperature of 248° F. (120° C.) during extrusion, with a screw speed of 300 rpm. The die spacer temperature 232° F. (111° C.). The pressure at the die was 350 psi.

The extrusion process, through high pressure, shear, and temperature, yielded a plastic mass which rapidly solidified into an amorphous matrix as the product was forced out of the die section of the extruder into the ambient conditions. A knife assembly at the end of the extruder was used to cut the product into easily conveyable pellets. The pellets were cut to a length of approximately ½" long and ¼" in diameter and were then conveyed into a gas-fired two pass belt dryer, operating 110° C., for a total of 22 mins. of drying time. The dried pellet from of the preferred salt composition was milled to a particle size of about 40-mesh, although in alternate embodiments a larger mesh size such as a 40 to about 100-mesh will be acceptable and even larger mesh sizes and perhaps even smaller mesh sizes may be acceptable for many uses.

There were different temperatures in each zone of the extruder, but the cooking area generally reached from about 100 to about 120 degrees C. The tests were run at a pressure of 300-500 psi at the die opening.

The hot extruded mixture or "extrudate", that was extruded through the die in the form of strands was cut into smaller manageable pieces as reported above and then conveyed to the dryer, as reported above, where the pieces pellets were dried down to approximately 3-7% moisture.

In alternate embodiments, the respective dry ingredients need not be blended prior to blending the dry ingredients with water in the extruder if the respective dry ingredients are blended together in streams of feed in suitable ratios, so that all of the mixing occurs in the extruder.

Analytical Testing

A sample of the low-sodium salt composition produced by the process described in Example 2 was analyzed by Medallion Labs, Minneapolis, Minn. Sodium and potassium content was determined by Medallion Labs using standard elemental analysis using Atomic Absorption Spectrometry. It will be appreciated that common salt typically contains about 40% sodium. It was determined during the testing that the sample of the salt composition had the following moisture content and elemental composition:

| | |
|---|---|
| Moisture (%) | 5.16 |
| Sodium (%) | 10.40 |
| Potassium (%) | 10.60 |

The salt composition of the present invention described immediately above was evaluated in a sensory evaluation by adding the sample to instant mashed potatoes (to give 75% sodium equivalence of common salt, or in other words 25% less sodium than common salt) and compared to common salt on the same instant mashed potatoes.

The formula for making samples for sensory testing was:
26.5 g of instant mashed potatoes
71.5 g of hot water
1.0 g of common salt (or 3.0 g of the sample of the salt composition from Example 2, described above).

Upon evaluation of the mashed potatoes containing the present invention, trained sensory professionals determined that there was no significant differences in the saltiness between the two samples, and more significantly there was no 'bitterness and/or off-flavors' associated with potassium content in the alternate salt composition or the rice flour modifier in the composition. In addition, the alternate salt composition itself dispersed well into the water was white in appearance and smooth in texture.

EXAMPLE 3

Drum Drying to Make Low-Sodium Salt Composition

An Atmospheric Double Drum Dryer (Model No. ALC-4 (Buflovak Division, Blaw-Knox Food and Chemical Equipment, Inc., Buffalo, N.Y.) was used that had a 6 inch drum diameter, an 8 inch drum length and a drum surface of 2.1 square feet. The material to be dried is pumped or poured into a nip between the two respective drums. The thickness of the sheets of dried product is controlled by adjustment of the gap between the two drums and by the drum revolution speed.

Sample 3a. A dry mix was made consisting of:
50% fine rice flour
25% regular food grade salt
25% potassium chloride From this premix, 100 g was taken and mixed with 300 g of water, cooked to a pasting temp of 185° F., and drum dried using an Atmospheric Double Drum Dryer-Model No. ALC-4 6×8 (Buflovak Division, Blaw-Knox Food and Chemical Equipment, Inc., Buffalo, N.Y.), at a steam pressure of 25 psig and drum speed of approximately 1.2 rpm and gap clearance of approximately 0.25 inches. The product dried easily and sheeted cleanly into very smooth homogenous flakes. The final product was very white, smooth, homogenous and very easy to crumble into smaller flakes. This material was allowed to equilibrate at room temperature and was then ground in a Udy Cyclone Mill through a 1 mm screen. It was found to have approximately 10% sodium and 10% potassium following elemental analysis conducted on a sample of the salt composition. In sensory testing, this was as good or better than a similar mix that was processed by extrusion cooking.

Sample 3b. A premix was made that includes:
50% Fine rice flour
50% Potassium chloride From this, 100 g was mixed with 400 g of water, and cooked to a pasting temp of 180° F., followed by drum drying at 25 psig, 1.2 rpm and gap clearance of 0.025 inches. The cooked sample was light yellow tan in color, but after drying appeared white. Nice crisp sheets that easily dried and fell off the rollers. Again this was equilibrated at room temp, and ground through a 1 mm screen in a Udy Cyclone Mill. This material was reported to have <1% sodium and approximately 25% potassium following elemental analysis conducted on a sample of the salt composition. This sample was blended with pure Regular Morton's Salt at a 1:1 ratio to give a final product composition of 20% sodium and 12.5% potassium. This blend was found to be superior in dissolution characteristic and sensory properties when compared to a similar composition obtained by co-processing sodium chloride and potassium chloride together.

EXAMPLE 4

Drum Drying Continued

The atmospheric Double Drum Dryer (6 inch drum diameter, 8 inch drum length and drum surface of 2.1 square feet) used in Example 4 was used to produce three further samples of salt compositions. The material to be dried is poured into the nip between the two counter rotating drums with the thickness of the material coating the drums controlled by adjustment of the gap between the two drums and the drum revolution speed.

All of the samples were prepared using the following method with additions in the given sequence:

Sample 4a: Modified Potassium Chloride Only, Blended with Sodium Chloride Prior to Milling.
1. Approximately 500 g. of hot water (180° F./82° C.) was weighed into a 1,000 ml. beaker and placed on a hot plate using a magnetic stirrer.
2. Approximately 250 g. of potassium chloride (Nutri-K®, Rhesis Inc., 235 Snyder Ave., Berkeley Heights, N.J.) was added to the hot water with constant stirring.
3. Approximately 5 g. of Fine Anhydrous Citric acid (Lot No. CA4L192B4, FCC, USP-Tate & Lyle, Decatur, Ill.) was added and mixing was continued until all of the salt was in solution.
4. The final ingredient added was approximately 50 g. of Fine Rice Flour (PGP International, 351 Hanson Way, Woodland, Calif. 95776).
5. The entire sample was then heated to approximately 165° F./73° C. when the solution visibly showed a thickening of viscosity. Sample pH was 3.61 at 160° F. and viscosity was determined to be 180 cps using a Brookfield Viscometer (spindle 3, speed 30).
6. The sample was dried on the drum dryer at a steam pressure of 40 psig and drum speed of approximately 1.66 rpm and a gap clearance of approximately 0.25 inches.

The product dried easily and sheeted cleanly into very smooth homogenous flakes. The final product was very white, smooth, homogenous and very easy to crumble into smaller flakes. Final yield was approximately 280.0 g. This material was allowed to equilibrate at room temperature, blended with an equal weight of sodium chloride, then ground in a Udy Cyclone Mill through a 1 mm screen (UDY Corporation, 201 Rome Court, Fort Collins, Colo. 80524).

Sample 4b: 50/50 Sodium Chloride and Potassium Chloride
1. Approximately 500 g. of hot water (180° F./82° C.) was weighed into a 1,000 ml. beaker and placed on a hot plate using a magnetic stirrer.
2. Approximately 125 g. of sodium chloride (Top-Flo® evaporated salt, Cargill, Inc. Minneapolis, Minn.) and 125 g. of potassium chloride (Nutri-K®, Rhesis Inc., 235 Snyder Ave., Berkeley Heights, N.J.) were added to the hot water with constant stirring.
3. Approximately 5 g. of Fine Anhydrous Citric acid (Lot No. CA4L192B4, FCC, USP-Tate & Lyle, Decatur, Ill.) was added and mixing was continued until all of the salt was in solution.
4. The final ingredient added was approximately 50 g. of Fine Rice Flour (PGP International, 351 Hanson Way, Woodland, Calif. 95776)
5. The entire sample was then heated to approximately 165° F./73° C. when the solution visibly showed a thickening of viscosity. The sample pH was 2.62 at 160° F. and viscosity was determined to be 820 cps using a Brookfield Viscometer (spindle 3, speed 30).
6. The sample was dried on the drum dryer at a steam pressure of 40 psig and drum speed of approximately 1.66 rpm and a gap clearance of approximately 0.25 inches.

The product dried easily and sheeted cleanly into very smooth homogenous flakes. The final product was very white, smooth, homogenous and very easy to crumble into smaller flakes. This material was allowed to equilibrate at room temperature and ground in a Udy Cyclone Mill thru a 1 mm screen (UDY Corporation, 201 Rome Court, Fort Collins, Colo. 80524). Final yield was approximately 262.9 g.

Sample 4c: Modified Potassium Chloride with Lysine, Blended with Sodium Chloride Prior to Milling.

4. Approximately 500 g. of hot water (180° F./82° C.) was weighed into a 1,000 ml. beaker and placed on a hot plate using a magnetic stirrer.
5. Approximately 250 g. of Potassium Chloride (Nutri-K®, Rhesis Inc., 235 Snyder Ave., Berkeley Heights, N.J.) was added to the hot water with constant stirring.
6. Approximately 5 g. of Fine Anhydrous Citric acid (Lot # CA4L192B4, FCC, USP-Tate & Lyle, Decatur, Ill.) was added.
7. Approximately 5.0 g. of L-Lysine Monohydrochloride (Ajinomoto Co., Inc., Tokyo, Japan) was added the sample.
8. The final ingredient added was approximately 50 g. of Fine Rice Flour (PGP International, 351 Hanson Way, Woodland, Calif. 95776).
9. The entire sample was then heated to approximately 165° F./73° C. when the solution visibly showed thickening of viscosity. The sample pH was 3.90 at 160° F. Viscosity was 90 cps and was measured using a Brookfield Viscometer (spindle 3, speed 30).
10. The sample was dried on the drum dryer at a steam pressure of 40 psig and drum speed of approximately 1.66 rpm and gap clearance of approximately 0.25 in.

The product dried easily and sheeted cleanly into very smooth homogenous flakes. The final product was very white, smooth, homogenous and very easy to crumble into smaller flakes. The final yield was approximately 289.9 g. This material was allowed to equilibrate at room temperature, blended with an equal weight of sodium chloride, then ground in a Udy cyclone mill through a 1 mm screen (UDY Corporation, 201 Rome Court, Fort Collins, Colo. 80524). A 20 g. sample was submitted to Medallion Labs for sodium/potassium analysis.

TABLE 2

Results of pH and viscosity testing

| Sample | Formulation | pH @ 160° F. | Viscosity (cps) | Final Weight (g) |
|---|---|---|---|---|
| 4a | 250 g. KCl<br>5 g. citric acid<br>50 g. rice flour<br>500 g. water | 3.61 | 180 | 280.0 |
| 4b | 125 g. salt<br>125 g. KCl<br>5 g. citric acid<br>50 g. rice flour<br>500 g. water | 2.62 | 820 | 262.90 |
| 4c | 205 g. KCl<br>5 g. citric acid<br>5 g. L-lysine<br>50 g. rice flour<br>500 g. water | 3.90 | 90 | 289.9 |

EXAMPLE 5

Drum Drying Continued

Example 5 utilizes drum drying methods similar to those reported in Example 4 above.

Equipment: Samples were mixed and heated using a swept surface steam jacketed kettle, approximately 5 gallon capacity (Groen Kettle, model No. TDB7-20 self contained electric steam jacket kettle, Groen/Dover Industries, 1900 Pratt Blvd. Elk Grove, Il. 60007).

Drying equipment used for all samples was a pilot scale Atmospheric Double Drum Dryer (6 in. drum diameter, 8 in. drum length and drum surface of 2.1 sq.ft.). The material to be dried was poured into the nip between the two counter rotating drums with the thickness of the material coating the drums controlled by adjustment of the gap between the two drums and the drum revolution speed. The specific drum dryer used was Model No. ALC-4 (Buflovak Division, Blaw-Knox Food and Chemical Equipment, Inc., Buffalo, N.Y.).

Ingredients:

Hot tap water, at approximately 180° F.

Potassium chloride (Nutri-K®, Rhesis Inc., 235 Snyder Ave., Berkeley Heights, N.J.)

Fine Rice flour (PGP International, 351 Hanson Way, Woodland, Calif. 95776)

Fine Anhydrous Citric acid (Lot No. CA4L192B4, FCC, USP-Tate & Lyle, Decatur, Ill.)

Salt-sodium chloride (Top-Flo® evaporated salt, Cargill, Inc. Minneapolis, Minn.)

Silicon dioxide (Zeofree® 80, JM Huber Corporation, Atlanta, Ga.)

Sample 5a: Modified Potassium Chloride by Drum Drying

Prepared using the following method with additions in the given sequence:

1. Approximately 1000 g. of hot water (180° F.) was weighed into the steam kettle, approximately 500 g. of potassium chloride was added with constant stirring.
2. Approximately 10 g. of citric acid was added. The solution was allowed to stir until all ingredients were fully dissolved.
3. Approximately 100 g. of Fine Rice Flour was added with constant agitation.
4. The sample was then heated to approximately 165° F. when it visibly showed a thickening of viscosity.
5. Samples were dried on the drum dryer at a steam pressure of 40 psig and drum speed of approximately 1.66 rpm and gap clearance of approximately 0.25 in.

Formulation of Sample 5a:

| Ingredient | Amount (g) | % by wt | Dry Basis % by wt |
|---|---|---|---|
| Water | 1000 | 62.11 | Variable |
| Potassium Chloride | 500 | 31.06 | 82 |
| Citric Acid | 10 | 0.62 | 1.5 |
| Rice Flour | 100 | 6.21 | 16.5 |
| Total | 1610 | 100% | 100% |

Summarized Mix Procedure: Heated water to 180° F., then added KCl, mixed for 2-3 minutes, added the citric acid, stirred until completely dissolved. Added rice flour with constant mixing to avoid lumps. Heated to final temperature of 165° F. This final mixture did not seem smooth, slightly gritty, but dried easily and smoothly.

Drying Conditions Sample 5a:

| Time | Steam Pressure (psig) | Drum Speed (rpm) | Comments |
|---|---|---|---|
| 10:50 start | 40 | 5.40 on setting | Good even drying immediately. |
| 11:00 | 39 | " | |
| 11:10 | 40 | " | |
| 11:20 shut down | | | Nice white flakes. |

The product dried easily and sheeted cleanly into very smooth homogenous flakes. The final product was very white, smooth, homogenous and very easy to crumble into smaller flakes. Total amount of dried material from this trial was 560 grams.

Sample 5b: Modified Potassium Chloride

Prepared using the following method with additions in the given sequence:

1. Approximately 2000 g. of hot water (180° F.) was weighed into the steam kettle, heated to 195° F. approximately 500 g. of potassium chloride was added with constant stirring.
2. Approximately 20 g. of citric acid was added. Solution was allowed to stir until all ingredients were fully dissolved.
3. Approximately 200 g. of Fine Rice Flour was added with constant agitation.
4. The sample was then heated to approximately 180° F. when it visibly showed a thickening of viscosity.
5. Samples were dried on the drum dryer at a steam pressure of 40 psig and drum speed of approximately 1.66 rpm and gap clearance of approximately 0.25 in.

The mixture was slightly thicker than Sample No. 5a, very smooth and homogenous. The product dried easily and sheeted cleanly into very smooth homogenous flakes. The final product was very white, smooth, homogenous and very easy to crumble into smaller flakes. Total amount of dried material from this trial was 1060 g.

Samples 5i a and 5b were combined, then blended 50/50 with regular Cargill TOP-FLO salt, and ground using a Udy Cyclone Mill with a 1 mm screen (UDY Corporation, 201 Rome Court, Fort Collins, Colo. 80524). To prevent clumping and caking during storage, 1% silicon dioxide (ZEOFREE 80, JM Huber Corporation, Atlanta, Ga.) was added.

Summary Formulation Sample 5b:

| Ingredient | Amount (g) | % by wt | Dry Basis % by wt |
|---|---|---|---|
| Water | 2000 | 62.11 | Variable |
| Potassium Chloride | 1000 | 31.06 | 82 |
| Citric Acid | 20 | 0.62 | 1.5 |
| Rice Flour | 200 | 6.21 | 16.5 |
| Total | 3220 | 100% | 100% |

Mix Procedure: Heated water to 195° F., then added KCl, mixed for 2-3 minutes, added the citric acid, stirred until completely dissolved. Added rice flour with constant mixing to avoid lumps. Heated to final temperature of 185° F. This final mixture was more smooth, a little thicker that Batch No. 1. Dried easily and smoothly.

Drying Conditions for Sample 5b:

| Time | Steam Pressure (psig) | Drum Speed (rpm) | Comments |
|---|---|---|---|
| 11:30 start | 38 | 5.45 on setting | Good even drying immediately. |
| 11:40 | 39 | " | |
| 11:55 | 39 | " | |
| 12:15 shut down | | | Nice white flakes. |

We then followed up with drum drying and found out that a similar concept of drum drying KCl only with rice flour and a processing aid (citric acid) followed by 50/50 blend with common salt, led to a final product that is more 'acceptable', again, according to 'expert opinion'.

EXAMPLE 6

Sensory Testing with Potato Chip Application

The low-sodium salt composition of the present invention will be used to reduce the sodium content of food items such as cookies, cakes, torts, pies and other baked goods; chips, crackers, french fries, microwavable popcorn and other snack food products; ice cream, yogurt, cheese and other dairy products; injected meat and poultry, cured meat and poultry and other meat and poultry products; enhanced fruit and vegetable products; juices and other beverage products; marinades, spices, salad dressings, seasonings and other flavor blends that might otherwise generally include salt; other prepared foods that might otherwise generally include salt and the like.

Samples were sent to the University of Nebraska—Lincoln's Sensory Laboratory. In the following example, four salt or salt composition samples, labeled A, B, C and D were applied to unsalted potato chips and tested for the intensity/acceptability of the following attributes: appearance, crispness, saltiness, potato flavor, aftertaste and overall acceptability. A total of 41 people evaluated the samples. The results were reported to show no significant differences between the respective samples in any attribute tested.

Test Protocol Salted potato chip samples were prepared the day before a panel of taste test reviewers tasted the chips. On the day of the panel, three bags of chips for each respective treatment, i.e., unsalted potato chips treated with samples A, B, C, and D, respectively, were put into large bowls and gently mixed to create a single sample of chips for each treatment. Then three chips were placed on each of a series plates, one series for each of the respective samples. Each plate was labeled with a three digit random number assigned to each particular treatment. The samples were covered with SARAN (plastic) Wrap until served. This was done just prior to each tasting session, of which there were two, one at 9-10 a.m. and another from 2-3 p.m. A total of 41 panelists participated in the panel for the test.

The respective samples were either procured or made as follows:

Sample A: Cargill TOP-FLO Salt, ground through a 1 mm screen with a Udy grinder. Sample A contains 40% sodium.

Sample B: made by mixing 50% fine rice flour and 50% KCl with water, extruding the mixture by the method reported in Example 2, above, and then grinding the dried product and blending the ground product with Sample A (Cargill TOP-FLO Salt) and then go-ground at a 50/50 ratio to give a salt composition of the present invention containing 20% sodium and 12.5% potassium.

Sample C: made by mixing 250 g KCl, 5 g citric acid and 50 g rice flour with 500 cc hot water. The aqueous mixture is then drum dried by the method described in Example 3, above, then co-ground and blended with Sample A at a 50/50 ratio to give a salt composition of the present invention containing 20% sodium and 20% potassium.

Sample D: Morton's Regular Salt, ground through a 1 mm screen with Udy grinder. Sample D contains 40% sodium.

Samples A and D were applied at 1.5 g (to provide 600 mg Na) per 100 g of chips

Samples B and C were applied at 2.25 g (to provide 450 mg Na) per 100 g of chips Results: The results, shown below in Table 1, below, are reported to indicate that no significant differences in any of the attributes were found between the various samples. Appearance and crispness were considered because the trained panelists would expect to be asked such questions. The attributes of concern greatest were saltiness, potato flavor, aftertaste and overall acceptability. The objective of the study was to see if there were any significant differences between the two samples of salt and the respective salt compositions of the present invention, Sample B and C, and ultimately determine whether embodiments of the present invention, such as Samples B and C, will be effective to reduce the Na content of the Chips by 25% (from 600 mg to 450 mg per 100 g) using embodiments of the present invention, such as Samples B and C, and testing those samples against standard salts, sold by Cargill Incorporated and Morton Salt, respectively. While there were no significant differences reported between the samples, Sample C reported to have a relatively higher salt intensity.

TABLE 1

Least Square Means of potato chips treated with different samples: A, B, C and D, described above.

| Sample | Appearance[1] | Crispness[2] | Saltiness[3] | Potato Flavor[2] | Aftertaste[1] | Overall Acceptability[1] |
|---|---|---|---|---|---|---|
| A | 9.62 | 8.68 | 7.31 | 7.55 | 8.13 | 8.00 |
| B | 9.92 | 9.18 | 7.70 | 7.44 | 7.73 | 7.76 |
| C | 9.99 | 8.39 | 8.54 | 7.18 | 7.32 | 7.38 |
| D | 9.12 | 9.26 | 7.90 | 7.89 | 8.20 | 8.05 |

[1]Where 0 = Very Undesirable and 15 = Very Desirable
[2]Where 0 = Not Very Crisp and 15 = Very Crisp
[3]Where 0 = Lacking and 15 = Intense Most Preferred Embodiment The most preferred invention will be made by drum drying the KCl with a masking agent comprising rice flour as a modifier and citric acid as a preferred acidulant followed by a 50/50 blend of this product with common salt. It should be noted that the "too salty" perception of the product leads to the reduced overall acceptability.

EXAMPLE 7

Sensory Testing of Sample C ("S&P Salt Composition")

Samples were sent to Leatherhead Food International, Randalls Road, Leatherhead, Surrey KT22 7RY to assess the supplied salt products for any evidence of difference. All samples were supplied by S&P Development LLC in foil bags. The samples were as follows:

Assessment 1: 50% Reduction in Sodium
  The Control—1.5% Salt Composition C mixed on crushed plain crisps (LIMS 0602012)
  S&P Salt Composition—1.5% S&P Salt Composition mixed on crushed plain crisps (LIMS 0602013)
Assessment 2: 25% Reduction in Sodium
  The Control—1.5% Salt Composition C mixed on crushed plain crisps (LIMS 0602014)
  S&P Salt Composition—2.25% S&P Salt Composition mixed on crushed plain crisps (LIMS 0602015)
Assessment 3: Equivalent Amount of Sodium
  The Control—1.5% Salt Composition C mixed on crushed plain crisps (LIMS 0602016)
  S&P Salt Composition—3.0% S&P Salt Composition mixed on crushed plain crisps (LIMS 0602017)

Sample Preparation

Walker's Salt & Shake potato crisps were purchased from a local supermarket (the salt is in a sachet separate to the crisps). The crisps were crushed in a Stephan mixer for 30 seconds and the salt composition is added half way through the crushing.

Assessment Procedure

A triangle test was set up for evaluation (30 judgments) for each test. A forced choice method was used. In each test, panelists received three samples, two of one material and one of the other, using a random presentation order between panelists. Aliquots (approximately 1 teaspoon of each sample) were presented in disposable plastic pots coded with random three-digit numbers. Still mineral water was available as a palate cleanser, and panelists were instructed to rinse their mouths thoroughly between samples. Panelists were instructed to expectorate the samples after tasting. Tasting instructions were given and data acquisition was carried out using a computerized data collection system, Compusense 5 (Compusense Inc., Canada). An example of the assessment questionnaire is attached.

Panelists were asked to assess the samples in the order given on their computer and to identify the odd sample. They were then asked to describe the nature of the differences using a pre-defined list of attributes, or by adding any other descriptors they felt were relevant. The list of descriptors includes distracting descriptors added to minimize the risk of leading the panelists. Panelists also indicated which sample they preferred, and stated their confidence in their selection of the odd sample.

All assessments were carried out in individually partitioned booths, at a constant room temperature (approximately 22° C.) and under Northlight illumination. Assessments were carried out by trained sensory panelists of Leatherhead Food International.

Assessment 1

Tables 1 and 2 below summarize the results and detail descriptions of the Assessment 1—1.5% The Control vs. 1.5% S&P Salt Composition.

TABLE 1

Summary of results

| Number of panelists | | | Preference (no. of responses) | | | Confidence | | | |
|---|---|---|---|---|---|---|---|---|---|
| correct | incorrect | Significance level % | Control | S&P | NP | AS | FS | NVS | JG |
| 13 | 17 | 16.6% | 6 | 3 | 4 | 0 | 4 | 9 | 0 |

Key to Table
AS Absolutely sure
FS Fairly sure
NVS Not very sure
JG Just guessed
NP No preference No significant difference was found between the samples.

TABLE 2

Descriptors used

| Descriptors | The Control 1.5% | S&P 1.5% |
|---|---|---|
| Spontaneous comments | | |
| More salty | 6 | 1 |
| Less salty | 1 | 5 |
| Crunchy | 1 | 2 |
| Off character | 1 | |
| Stale | | 2 |
| Greasy | 1 | |
| Crispy | 1 | 1 |
| Not bitter | 1 | |
| Very bitter | | 1 |
| Metallic | | 1 |

Even, though a significant difference was not identified between the samples.

The Control was described as more salty by six assessors.

Assessment 2

Tables 3 and 4 below summarize the results and detail descriptions of the Assessment 2—1.5% The Control vs. 2.25% S&P Salt Composition.

TABLE 3

Summary of results of Assessment 2

| Number of panelists | | | Preference (no. of responses) | | | Confidence | | | |
|---|---|---|---|---|---|---|---|---|---|
| correct | incorrect | Significance level % | Control | S&P | NP | AS | FS | NVS | JG |
| 15 | 15 | 4.3 | 9 | 6 | 0 | 0 | 6 | 9 | 0 |

A significant difference was found between the samples.

TABLE 4

Descriptors used

| Descriptors | Salt Composition C 1.5% | S&P 2.25% |
|---|---|---|
| Spontaneous comments | | |
| More salty | 3 | 6 |
| Less salty | 4 | 4 |
| Crunchy | 1 | |

TABLE 4-continued

Descriptors used

| Descriptors | Salt Composition C 1.5% | S&P 2.25% |
|---|---|---|
| Off character | | |
| Stale | | |
| Greasy | | |
| Crispy | | |
| Less greasy | 1 | |
| Not bitter | 2 | |
| Very bitter | | 2 |
| Metallic | 1 | 2 |
| Sour | 1 | 1 |
| Plain crisp | 1 | |

Most respondents indicated they were 'not very sure' of their judgment, demonstrating that the difference between the two samples was not easily detected. This is reiterated by the fact that the descriptions used by panelists to detail the difference between samples are inconclusive, some citing the Control as saltier, others Salt Composition S&P.

Comparing the number of comments made relating to the relative saltiness of the two compounds, the S&P Salt Composition sample could be concluded to be more salty.

Assessment 3

Tables 5 and 6 below summarize the results and detail descriptions of the Assessment 3—1.5% Salt Composition C vs. 3.0% S&P Salt Composition.

TABLE 5

Summary of results of Assessment 3

| Number of panelists | | | Preference (no. of responses) | | | Confidence | | | |
|---|---|---|---|---|---|---|---|---|---|
| correct | incorrect | Significance level % | Control | S&P | NP | AS | FS | NVS | JG |
| 17 | 13 | 0.7 | 15 | 0 | 2 | 1 | 12 | 3 | 1 |

There was a highly significant difference between the samples. Preference was strongly towards the Control and confidence in selection was high.

TABLE 6

Descriptors used

| Descriptors | The Control 1.5% | S&P 3.0% |
|---|---|---|
| Spontaneous comments | | |
| More salty | 1 | 14 |
| Less salty | 11 | 1 |
| Crunchy | | |
| Milder | 1 | |
| Stale | | |
| Greasy | | |
| Crunchy | 1 | |
| Less greasy | | |
| Not bitter | | |
| Very bitter | | |
| Metallic | | 1 |
| Sour | 1 | 1 |
| Plain crisp | 1 | |

The S&P sample was described as being much more saltier than the Control.

Summary & Conclusions
1. No significant difference was found between the Control and S&P Salt Composition when S&P Salt Composition was used to reduce the sodium content by 25%.
2. At equal sodium amounts on the chips, S&P Salt Composition was perceived as "too salty," which leads to a reduction in the overall acceptability score, when this is really due only to the amount applied and not to the acceptability of the low-sodium salt composition.

Most Preferred Embodiments:

| | Ingredient | Drum Drying (optimal) | Extrusion Cooking (optimal) |
|---|---|---|---|
| Step 1 (Modified Potassium Chloride) | Water | Variable | Variable |
| | KCl | 45-85 (82) | 25-75 (50) |
| | Rice Flour | 10-20 (16.5) | 25-75 (50) |
| | Citric Acid | 0.5-3.0 (1.5) | 0.1 (1.0) |

| | Ingredient | Percentage by wt (optimal) |
|---|---|---|
| Step 2 (Blendng) | NaCl | 10-90 (50) |
| | Modified Potassium Chloride | 10-90 (50) |
| | Silicon dioxide | 0.1-1.0 (optional) |

| | Ingredient | Percent by wt | Optimal % by wt* |
|---|---|---|---|
| Final Salt Composition | NaCl | 10-90 | 50 |
| | KCl | 2-80 | 40 |
| | Rice flour | 1.0-75 | 8 |
| | Citric Acid | 0.1-5 | 1 |
| | Silicon dioxide | 0.1-2 | 1 |

*The optimal embodiment is a 50/50 blend of NaCl and Modified Potassium Chloride (MPC).

While the invention has been particularly shown and described with reference to preferred embodiments thereof, it will be understood by those skilled in the art that various changes in form and details may be made therein without departing from the spirit and scope of the invention. Thus, it is apparent that there has been provided, in accordance with the present invention, novel salt compositions and methods of manufacture. While the invention has been described in conjunction with specific embodiments thereof, it is evident that many alternatives, modifications and variations will be apparent to those skilled in the art in light of the foregoing description. Accordingly, it is intended to include all such alternatives, modifications and variations as set forth within the spirit and scope of the appended claims.

What is claimed is:

1. A seasoning agent consisting of:
   modified potassium chloride composition derived from a plasticized mass of potassium chloride, a food grade acidulant, and a cereal flour,
   wherein the plasticized mass is an aqueous mixture of from about 2 to about 80 percent by weight of cereal flour, from about 0.1 to about 10 percent by weight of the food grade acidulant, and from about 10 to about 85 percent by weight of potassium chloride in water, and
   wherein the aqueous mixture is heat processed and dried such that the potassium ions and the chloride ions of the potassium chloride are dissociated from each other in a non-crystalline, amorphous matrix comprising the cereal flour.

2. The seasoning agent of claim 1, wherein the food grade acidulant is citric acid.

3. The seasoning agent of claim 1, wherein the aqueous mixture has a pH from about 3.0 to about 5.0.

4. The seasoning agent of claim 1, wherein the cereal flour includes rice flour.

5. The seasoning agent of claim 1, wherein the food grade acidulant is dispersed within the matrix.

* * * * *

UNITED STATES PATENT AND TRADEMARK OFFICE
CERTIFICATE OF CORRECTION

| | | |
|---|---|---|
| PATENT NO. | : 9,474,297 B2 | Page 1 of 2 |
| APPLICATION NO. | : 12/067009 | |
| DATED | : October 25, 2016 | |
| INVENTOR(S) | : Sambasiva Rao Chigurupati | |

It is certified that error appears in the above-identified patent and that said Letters Patent is hereby corrected as shown below:

In the Specification

Column 1, Line 13, after 60/717,001 insert -- , --, therefor.

Column 9, Lines 56-64, delete "Subsequently, the dried KCl containing mixture, in which only the KCl off-flavors are masked, is ground and subsequently blended with salt. In preferred embodiments, the dried KCl containing mixture is co-ground with salt to yield the preferred salt composition. It was immediately perceived that the following was a novel idea: using the masking agent or modifier alone to mask only the off-flavors and bitter notes associated with KCl and not the saltiness associated with the NaCl." and insert the same on Column 9, Line 55, as a continuation of the same paragraph.

Column 17, Line 7, delete "4." and insert -- 1. --, therefor.

Column 17, Line 10, delete "5." and insert -- 2. --, therefor.

Column 17, Line 13, delete "6." and insert -- 3. --, therefor.

Column 17, Line 16, delete "7." and insert -- 4. --, therefor.

Column 17, Line 20, delete "8." and insert -- 5. --, therefor.

Column 17, Line 23, delete "9." and insert -- 6. --, therefor.

Column 17, Line 28, delete "10." and insert -- 7. --, therefor.

Column 19, Line 44, delete "5i a" and insert -- 5a --, therefor.

Column 20, Line 43, after "Protocol" insert -- : --.

Signed and Sealed this
Twenty-eighth Day of February, 2017

Michelle K. Lee
*Director of the United States Patent and Trademark Office*

CERTIFICATE OF CORRECTION (continued)
U.S. Pat. No. 9,474,297 B2

Column 21, Lines 19-31, delete "The objective of the study was to see if there were any significant differences between the two samples of salt and the respective salt compositions of the present invention, Sample B and C, and ultimately determine whether embodiments of the present invention, such as Samples B and C, will be effective to reduce the Na content of the Chips by 25% (from 600 mg to 450 mg per 100 g) using embodiments of the present invention, such as Samples B and C, and testing those samples against standard salts, sold by Cargill Incorporated and Morton Salt, respectively. While there were no significant differences reported between the samples, Sample C reported to have a relatively higher salt intensity." and insert the same on Column 21, Line 20, as a new paragraph.

Column 25, Line 60, delete "(Blendng)" and insert -- (Blending) --, therefor.